(12) United States Patent
Hamasaki et al.

(10) Patent No.: US 7,839,053 B2
(45) Date of Patent: Nov. 23, 2010

(54) ONE-WAY ROTATIONAL TRANSFER MECHANISM, AND ULTRASONIC ROTARY DRIVE DEVICE INCORPORATING ONE-WAY ROTATIONAL TRANSFER MECHANISM

(75) Inventors: Takuji Hamasaki, Saitama (JP); Takahiro Kobayashi, Saitama (JP)

(73) Assignee: Hoya Corporation, Tokyo (JP)

( * ) Notice: Subject to any disclaimer, the term of this patent is extended or adjusted under 35 U.S.C. 154(b) by 217 days.

(21) Appl. No.: 12/056,676

(22) Filed: Mar. 27, 2008

(65) Prior Publication Data
US 2008/0238253 A1    Oct. 2, 2008

(30) Foreign Application Priority Data
Mar. 28, 2007    (JP)    ............... 2007-083579

(51) Int. Cl.
*H02N 2/12*    (2006.01)
(52) U.S. Cl. ............... 310/323.01; 310/323.14
(58) Field of Classification Search ...............
310/323.01–323.21, 328; 192/41 R, 44
See application file for complete search history.

(56) References Cited

U.S. PATENT DOCUMENTS

| 7,334,647 | B2 * | 2/2008 | Hahn ............... 173/178 |
| 7,503,443 | B1 * | 3/2009 | Dobras ............... 192/48.6 |
| 2001/0013740 | A1 * | 8/2001 | Fukui et al. ............ 310/323.04 |
| 2003/0156832 | A1 | 8/2003 | Nomura et al. |
| 2003/0230459 | A1 | 12/2003 | Hamasaki |
| 2005/0072646 | A1 | 4/2005 | Hamasaki et al. |
| 2005/0087416 | A1 | 4/2005 | Iikawa et al. |
| 2005/0094992 | A1 | 5/2005 | Hamasaki et al. |
| 2005/0115358 | A1 | 6/2005 | Hamasaki et al. |
| 2005/0183917 | A1 | 8/2005 | Hamasaki et al. |
| 2006/0248969 | A1 | 11/2006 | Seo et al. |
| 2007/0254743 | A1 * | 11/2007 | Bristol et al. ............... 464/10 |

FOREIGN PATENT DOCUMENTS

| JP | 8-177878 | 7/1996 |
| JP | 2004-69054 | 3/2004 |

OTHER PUBLICATIONS

English language Abstract of JP 8-177878.
English language Abstract of JP 2004-69054.

* cited by examiner

*Primary Examiner*—Walter Benson
*Assistant Examiner*—Derek J Rosenau
(74) *Attorney, Agent, or Firm*—Greenblum & Bernstein, P.L.C.

(57) ABSTRACT

A one-way rotational transfer mechanism includes a rotary input member; a holding member including an axially orthogonal surface to the axis; a hollow-cylindrical rotary output shaft positioned coaxially around the rotary input member to be rotatable relative to the rotary input member, and including a cylindrical inner peripheral surface; a circumferential guide groove formed on the rotary input member; and a torque transfer ball installed between the axially orthogonal surface, the cylindrical inner peripheral surface and the circumferential guide groove, to roll on and be held between the axially orthogonal surface and the circumferential guide groove. The circumferential guide groove is shaped to make the torque transfer ball revolve around the rotary input member in a same direction as the rotary input member while trailing therebehind and to make the torque transfer ball press against the cylindrical inner peripheral surface when the rotary input member rotates.

12 Claims, 12 Drawing Sheets

Front ← → Rear

ONE-WAY ROTATIONAL TRANSFER MECHANISM, AND ULTRASONIC ROTARY DRIVE DEVICE INCORPORATING ONE-WAY ROTATIONAL TRANSFER MECHANISM

BACKGROUND OF THE INVENTION

1. Field of the Invention

The present invention relates to a one-way rotational transfer mechanism having a rotary input shaft and a rotary output shaft which are concentrically arranged, wherein rotation of the rotary input shaft is transferred to the rotary output shaft when the rotary input shaft is rotated, but rotation of the rotary output shaft is not transferred to the rotary input shaft when the rotary output shaft is rotated. The present invention further relates to an ultrasonic rotary drive device incorporating this one-way rotational transfer mechanism.

2. Description of the Related Art

An example of a one-way rotational transfer mechanism having a rotary input shaft and a rotary output shaft which are concentrically arranged, wherein rotation of the rotary input shaft is transferred to the rotary output shaft when the rotary input shaft is rotated but rotation of the rotary output shaft is not transferred to the rotary input shaft when the rotary output shaft is rotated, is disclosed in, e.g., Japanese unexamined patent publication H08-177878 (hereinafter referred to as Patent Document 1).

The one-way rotational transfer mechanism disclosed in Patent Document 1 is provided with: an outer ring (rotary input member) and an inner ring (rotary output member) which are provided as concentrically-arranged ring members; a retainer positioned between the outer ring and the inner ring to be rotatable relative to both the outer ring and the inner ring (the retainer rotates in the same rotational direction as the outer ring while trailing behind the rotation of the outer ring when the outer ring rotates); and a plurality of rollers (torque transfer members) held in a plurality of pockets (through holes) to be rotatable therein which are formed in the retainer along a circumferential direction. The outer peripheral surface of the inner ring is formed in a cylindrical shape, and the outer ring is provided on the inner peripheral surface thereof with a plurality of cam surfaces (circumferentially-uneven-width grooves) having different radial depths at different circumferential positions which are arranged in a circumferential direction.

In this one-way rotational transfer mechanism, since a rotation of the outer ring in one rotational direction causes the retainer to rotate in the same rotational direction while trailing behind the rotation of the outer ring, each roller firmly wedges between one of the circumferentially opposite ends of the associated cam surface and the outer peripheral surface (cylindrical surface) of the inner ring. Thereupon, the rotation of the outer ring is transferred to the inner ring via the plurality of rollers, so that the inner ring rotates in the same rotational direction as the outer ring while trailing behind the rotation of the outer ring. On the other hand, even if the inner ring is rotated, the rotation of the inner ring is not transferred to the outer ring because this rotation of the inner ring is not transferred to the outer ring via the outer peripheral surface (cylindrical surface) of the inner ring (each roller is not moved to either of the circumferentially opposite ends of the associated cam surface).

The one-way rotational transfer mechanism disclosed in Patent document 1 requires the aforementioned retainer that rotates relative to the outer ring (rotary input member), which increases the number of elements of the one-way rotational transfer mechanism and complicates the structure thereof.

However, if the retainer is omitted from the one-way rotational transfer mechanism disclosed in Patent document 1 (or if the cylindrical outer peripheral portion of the retainer (in which the aforementioned plurality of pockets are formed) is omitted from the retainer), the plurality of rollers would be freely movable between the inner ring and the outer ring, and consequently, the plurality of rollers would move asynchronously with one another. In the case where the plurality of rollers move asynchronously with one another in this manner, in a state where each roller firmly edges between one of the circumferentially opposite ends of the associated cam surface and the outer peripheral surface (cylindrical surface) of the inner ring, rotating the outer ring in the rotational direction opposite to the previous rotational direction of the outer ring (rotational direction of the outer ring immediately before each roller firmly edges between the one circumferential end of the associated cam surface and the outer peripheral surface of the inner ring) causes each roller to be disengaged from therebetween asynchronously with other rollers, i.e., to be disengaged from therebetween at different times. If the plurality of rollers are disengaged at different times in such a manner, it takes time until the wedging force (contacting force) completely disappears, which makes it difficult to rotate the outer ring smoothly in the reverse rotational direction.

SUMMARY OF THE INVENTION

The present invention provides a one-way rotational transfer mechanism which is configured to be capable of releasing the plurality of torque transfer members which are firmly wedged between the rotary input member and the rotary output member (firmly pressed against the rotary output member) from the wedged state (pressure-contacting state) simultaneously and smoothly. The present invention further provides an ultrasonic rotary drive device which incorporates this one-way rotational transfer mechanism.

According to an aspect of the present invention, a one-way rotational transfer mechanism is provided, a one-way rotational transfer mechanism is provided, including a rotary input member rotatable about an axis; a holding member including an axially orthogonal surface lying on a plane orthogonal to the axis; a hollow-cylindrical rotary output shaft positioned coaxially around the rotary input member to be rotatable relative to the rotary input member, and including a cylindrical inner peripheral surface centered on the axis; a circumferential guide groove which is formed on a portion of the rotary input member which faces the axially orthogonal surface of the holding member so as to surround the axis as viewed in a direction of the axis; and a torque transfer ball installed in between the axially orthogonal surface, the cylindrical inner peripheral surface and the circumferential guide groove, so as to roll on the axially orthogonal surface and to be continuously held between the axially orthogonal surface and the circumferential guide groove. The circumferential guide groove is shaped to make the torque transfer ball revolve around the rotary input member in a same rotational direction as the rotary input member while trailing behind rotation of the rotary input member and to make the torque transfer ball press against the cylindrical inner peripheral surface when the rotary input member is rotated.

It is desirable for the circumferential guide groove to be formed in an arc shape with a predetermined curvature in cross section, and for the torque transfer ball to be identical in curvature to the circumferential guide groove.

It is desirable for the rotary input member to include a rotary input shaft rotatable about the axis; a grooved member which is non-rotatable relative to the rotary input shaft about the axis and movable relative to the rotary input shaft along the axis, the circumferential grooves being formed on the grooved member; and a biasing device which biases the grooved member toward the axially orthogonal surface.

It is desirable for a plurality of the circumferential guide grooves having common dimensions to each accommodate one of the torque transfer balls.

It is desirable for the holding member to be shaped into a cylinder which is positioned around the rotary input member.

It is desirable for a plurality of the circumferential guide grooves to be positioned at regular intervals about the axis.

It is desirable for the circumferential guide grooves to be communicatively connected to one another so that all the circumferential guide grooves form an annular groove positioned around the axis.

It is desirable for a distance between an inner peripheral surface of the circumferential guide grooves and the cylindrical inner peripheral surface of the hollow-cylindrical rotary output shaft to change at different positions on the inner peripheral surface in a circumferential direction about the axis.

It is desirable for a distance from the inner peripheral surface of the circumferential guide groove to the cylindrical inner peripheral surface in a radial direction of the rotary input member to be greater at a central portion of the circumferential guide groove in a lengthwise direction thereof, and to decrease at a position away from the central portion toward either end of the circumferential guide groove in the lengthwise direction thereof.

It is desirable for the grooved member to be cylindrically shaped and to be fitted on the rotary input shaft to be allowed to slide on the rotary input shaft along the axis and to be prevented from rotating relative to the rotary input shaft about the axis.

It is desirable for the hollow-cylindrical rotary output shaft to include a small-diameter inner peripheral surface which is smaller in diameter than the cylindrical inner peripheral surface of the hollow-cylindrical rotary output shaft, the biasing device being positioned between the small-diameter inner peripheral surface and an outer peripheral surface of the rotary input shaft.

It is desirable for the biasing device to include a compression coil spring.

In an embodiment, a one-way rotational transfer mechanism is provided, including a hollow-cylindrical rotary input member rotatable about an axis; a holding member including an axially orthogonal surface lying on a plane orthogonal to the axis; a rotary output shaft positioned coaxially with the hollow-cylindrical rotary input member to be rotatable relative to the hollow-cylindrical rotary input member, the rotary output shaft including a cylindrical outer peripheral surface centered on the axis; a circumferential guide groove which is formed on a portion of the hollow-cylindrical rotary input member which faces the axially orthogonal surface of the holding member so as to surround the axis as viewed in a direction of the axis; and a torque transfer ball installed in between the axially orthogonal surface, the cylindrical outer peripheral surface and the circumferential guide groove, so as to roll on the axially orthogonal surface and to be continuously held between the axially orthogonal surface and the circumferential guide groove. The circumferential guide groove is shaped to make the torque transfer ball revolve around the rotary output shaft in a same rotational direction as the hollow-cylindrical rotary input member while trailing behind rotation of the hollow-cylindrical rotary input member and to make the torque transfer ball press against the cylindrical outer peripheral surface when the hollow-cylindrical rotary input member is rotated.

It is desirable for the circumferential guide groove to be formed in an arc shape with a predetermined curvature in cross section, and for the torque transfer ball to be identical in curvature to the circumferential guide groove.

It is desirable for the hollow-cylindrical rotary input member to include a hollow-cylindrical rotary input shaft rotatable about the axis; a grooved member which is non-rotatable relative to the hollow-cylindrical rotary input shaft about the axis and movable relative to the hollow-cylindrical rotary input shaft along the axis, the circumferential grooves being formed on the grooved member; and a biasing device which biases the grooved member toward the axially orthogonal surface.

It is desirable for a plurality of the circumferential guide grooves having common dimensions to each accommodate one of the torque transfer balls.

It is desirable for the holding member to be shaped into a cylinder which is positioned around the hollow-cylindrical rotary input member.

It is desirable for a plurality of the circumferential guide grooves to be positioned at regular intervals about the axis.

It is desirable for the circumferential guide grooves to be communicatively connected to one another so that all the circumferential guide grooves form an annular groove positioned around the axis.

It is desirable for a distance between an inner peripheral surface of the circumferential guide grooves and the cylindrical outer peripheral surface of the rotary output shaft changes at different positions on the inner peripheral surface in a circumferential direction about the axis.

It is desirable for a distance from the inner peripheral surface of the circumferential guide groove to the cylindrical outer peripheral surface in a radial direction of the hollow-cylindrical rotary input member to be greater at a central portion of the circumferential guide groove with respect to a lengthwise direction thereof, and to decrease at a position away from the central portion toward either end of the circumferential guide groove with respect to the lengthwise direction thereof.

It is desirable for the grooved member to be cylindrically shaped and to be fitted on the rotary output shaft to be allowed to slide on the rotary output shaft along the axis and to be prevented from rotating relative to the hollow-cylindrical rotary input shaft about the axis.

It is desirable for the hollow-cylindrical rotary input shaft to include a large-diameter inner peripheral surface, the biasing device being positioned between the large-diameter inner peripheral surface and an outer peripheral surface of the rotary output shaft.

It is desirable for the biasing device to be a compression coil spring.

According to the present invention, the range of rotation (revolution) of each toque transfer ball is limited by the associated circumferential guide groove. Therefore, in a state where each torque transfer ball is firmly pressed against the cylindrical inner peripheral surface of the hollow-cylindrical rotary output shaft, rotating the rotary input member in a rotational direction (ball-releasing direction) opposite to the previous rotational direction of the torque transfer balls (rotational direction of the torque transfer balls immediately before each torque transfer ball is firmly pressed against the cylindrical inner peripheral surface of the hollow-cylindrical rotary output shaft) causes each torque transfer ball to be released from the pressure-contacting state along the associated circumferential guide groove. Consequently, the torque transfer balls can be released from the pressure-contacting state simultaneously and smoothly.

Moreover, it is not necessary to provide the one-way rotational transfer mechanism with a retainer (element for retaining each roller such as disclosed in Patent Document 1) which rotates relative to the rotary input member, which simplifies the structure of the one-way rotational transfer mechanism.

Additionally, an ultrasonic rotary drive device incorporating an ultrasonic motor and the one-way rotational transfer mechanism is provided, the ultrasonic motor including an ultrasonic generating portion; and a rotary output portion which is in contact with the ultrasonic generating portion to be rotatable relative to the ultrasonic generating portion, is non-rotatable relative to the rotary input portion, and rotates by ultrasonic vibrations generated by the ultrasonic generating portion.

If the one-way rotational transfer mechanism is combined with an ultrasonic motor as described above, rotating the rotary output portion of the ultrasonic motor by ultrasonic vibrations generated by the ultrasonic generating portion causes a torque of the rotary output portion of the ultrasonic motor to be transferred from the rotary input member to the hollow-cylindrical rotary output shaft. However, when the hollow-cylindrical rotary output shaft is rotated, this rotation is not transferred to the rotary input member of the one-way rotational transfer mechanism.

Therefore, even if the hollow-cylindrical rotary output shaft of the one-way rotational transfer mechanism rotates when the ultrasonic generating portion of the ultrasonic motor is in a non-operating state, no friction by rotation occurs between the rotary output portion and the ultrasonic generating portion of the ultrasonic motor.

The present disclosure relates to subject matter contained in Japanese Patent Application No. 2007-83579 (filed on Mar. 28, 2007) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

An embodiment (first embodiment) of an ultrasonic rotary drive device MU according to the present invention is incorporated in an interchangeable lens (not shown) for a camera which can switch a photographing state between autofocus (AF) mode and manual focus (MF) mode.

The ultrasonic rotary drive device MU is an integral combination of an ultrasonic motor UM and a one-way rotational transfer mechanism DM. Firstly, the one-way rotational transfer mechanism DM will be discussed hereinafter.

Figure 1:
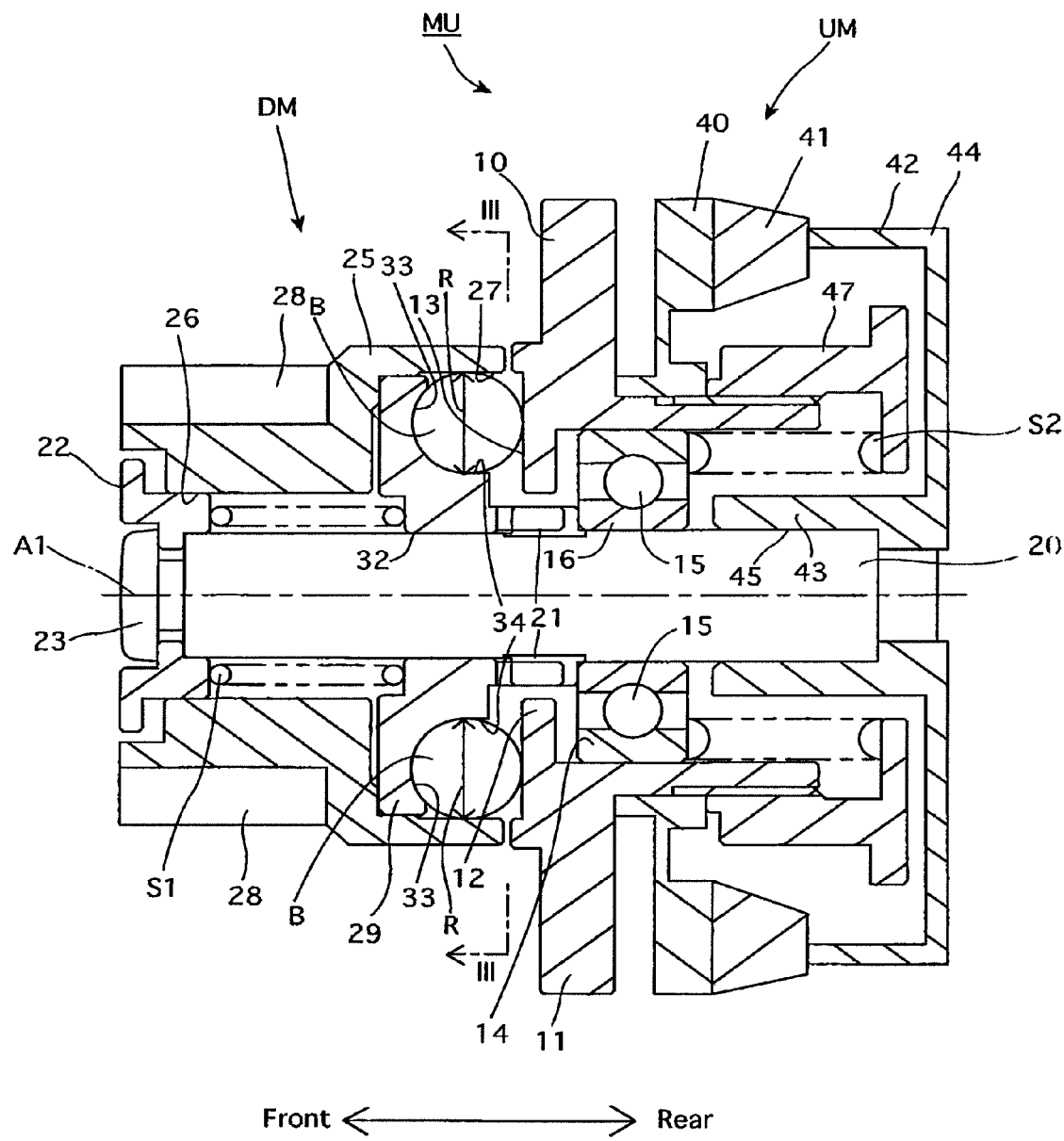
FIG. 1 is a longitudinal cross sectional view of an embodiment of an ultrasonic rotary drive device, according to the present invention.
Figure 2:
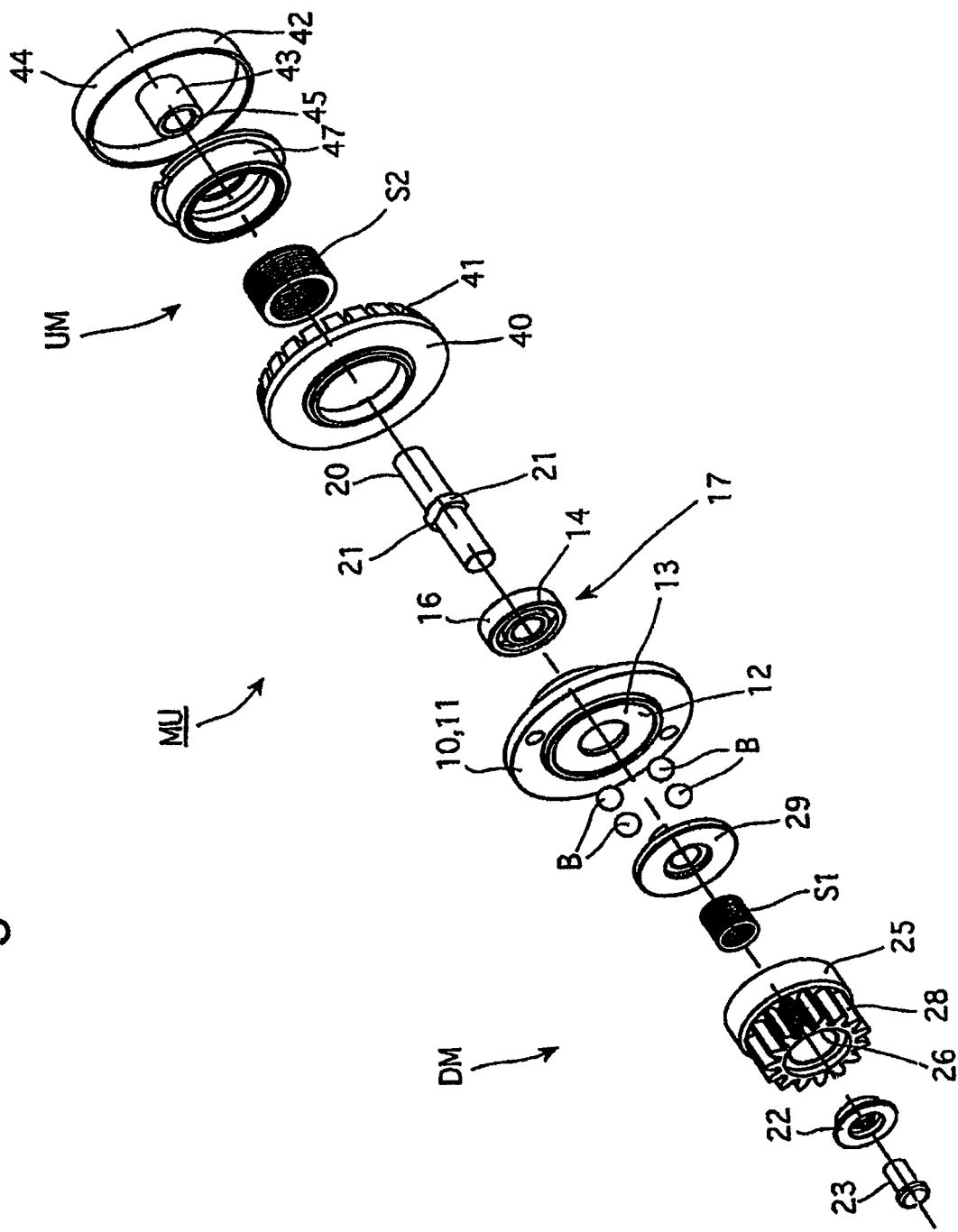
FIG. 2 is an exploded perspective view of the ultrasonic rotary drive device.
Figure 3:
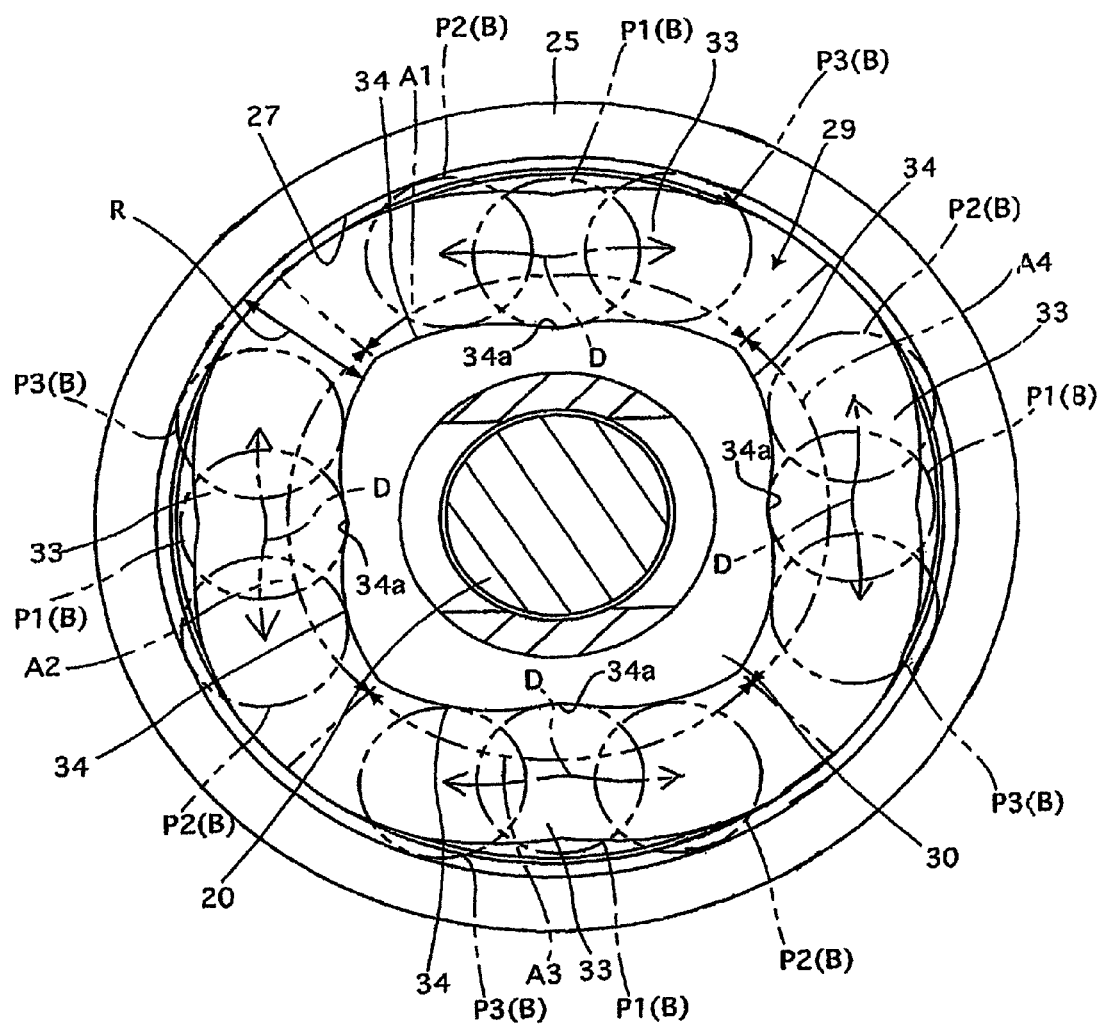
FIG. 3 is a cross sectional view taken along III-III line shown in FIG. 1, viewed in the direction of the appended arrows.

The one-way rotational transfer mechanism DM is provided with a stationary cylindrical member (holding member) 10, the front and rear ends of which are formed as open ends. The left-hand side and the right-hand side of the ultrasonic rotary drive device MU as viewed in FIG. 1 are defined as the front side and the rear side thereof as shown by the double-headed arrow in FIG. 1, respectively, in the following description. The stationary cylindrical member 10 is provided with an annular outer flange 11 and an annular inner flange 12 which protrude radially outwards and inwards, respectively. The outer flange 11 is fixed to an inner surface of a camera body (not shown) by set screws (not shown). A central portion of the front surface of the stationary cylindrical member 10 is formed as an axially orthogonal surface 13 which lies in a plane orthogonal to a central axis A1 of a rotary input shaft 20 (and the axis of the camera). An outer ring 14 is fitted into the stationary cylindrical member 10 to be slidable on an inner peripheral surface thereof (and to be prevented from rotating relative to this inner peripheral surface). An inner ring 16 is positioned radially inside of the outer ring 14 to be concentric with the outer ring 14 with a plurality of bearing balls 15 (only two of which are shown in FIG. 1) being held between the inner ring 16 and the outer ring 14. The inner ring 16 is rotatable relative to the outer ring 14 and prevented from moving in the axial direction relative to the outer ring 14. Accordingly, the outer ring 14, the plurality of bearing balls 15 and the inner ring 16 constitute a ball bearing 17.

The one-way rotational transfer mechanism DM is provided with the rotary input shaft (rotary input member) 20 which is fitted into the inner ring 16 to be prevented from rotating about the central axis A1 relative to the inner ring 16 and is slidable on the inner peripheral surface of the inner ring 16 in the direction of the central axis A1. The rotary input shaft 20 has a substantially columnar shape. The rotary input shaft 20 is provided, at the center of the outer peripheral surface thereof in the lengthwise direction of the rotary input shaft 20, with a pair of radial projections 21 which are arranged circumferentially at intervals of 180 degrees. A spring retainer 22 is fixed to the front end of the rotary input shaft 20 by a set screw 23. The one-way rotational transfer mechanism DM is provided with a cylindrical (hollow-cylindrical) rotary output shaft 25 arranged concentrically with the rotary input shaft 20. A portion of the inner peripheral surface of the cylindrical rotary output shaft 25 in the vicinity of the front end thereof is fitted on the spring retainer 22 to be rotatable about the central axis A1 relative to the rotary input shaft 20 and to be immovable in the axial direction relative to the rotary input shaft 20. The inner peripheral surface of the cylindrical rotary output shaft 25 is a cylindrical surface about the central axis A1 and includes a small-diameter cylindrical surface 26 and a large-diameter cylindrical surface (inner cylindrical surface) 27. The small-diameter cylindrical surface 26 forms substantially a front half of the inner peripheral surface of the cylindrical rotary output shaft 25 and is fitted on the spring retainer 22. The large-diameter cylindrical surface 27 forms substantially a rear half of the inner peripheral surface of the cylindrical rotary output shaft 25, is concentric with the small-diameter cylindrical surface 26, and has a greater diameter than the small-diameter cylindrical surface 26. The cylindrical rotary output shaft 25 is provided at a front end portion of the outer peripheral surface thereof with an output gear 28 which is engaged with an input gear of a focusing mechanism (not shown) installed inside the interchangeable lens.

The one-way rotational transfer mechanism DM is provided immediately in front of the pair of radial projections 21 with a grooved member (rotary input member) 29 formed in a ring shape which is arranged concentrically with the rotary input shaft 20. A circular central hole 32 is formed in the grooved member 29 therethrough, and the grooved member 29 is fitted on the rotary input shaft 20 (i.e., the rotary input shaft 20 is fitted into the circular central hole 32 of the grooved member 29) to allow the grooved member 29 to move in the direction of the central axis A1 relative to the rotary input shaft 20 and to prevent the grooved member 29 from rotating relative to the rotary input shaft 20. A compression coil spring (biasing device) S1 is installed in a compressed state over the rotary input shaft 20 between surfaces of the grooved member 29 and the spring retainer 22 which face each other so that the grooved member 29 is continuously biased rearward by the biasing force of the compression coil spring S1.

Figure 6:
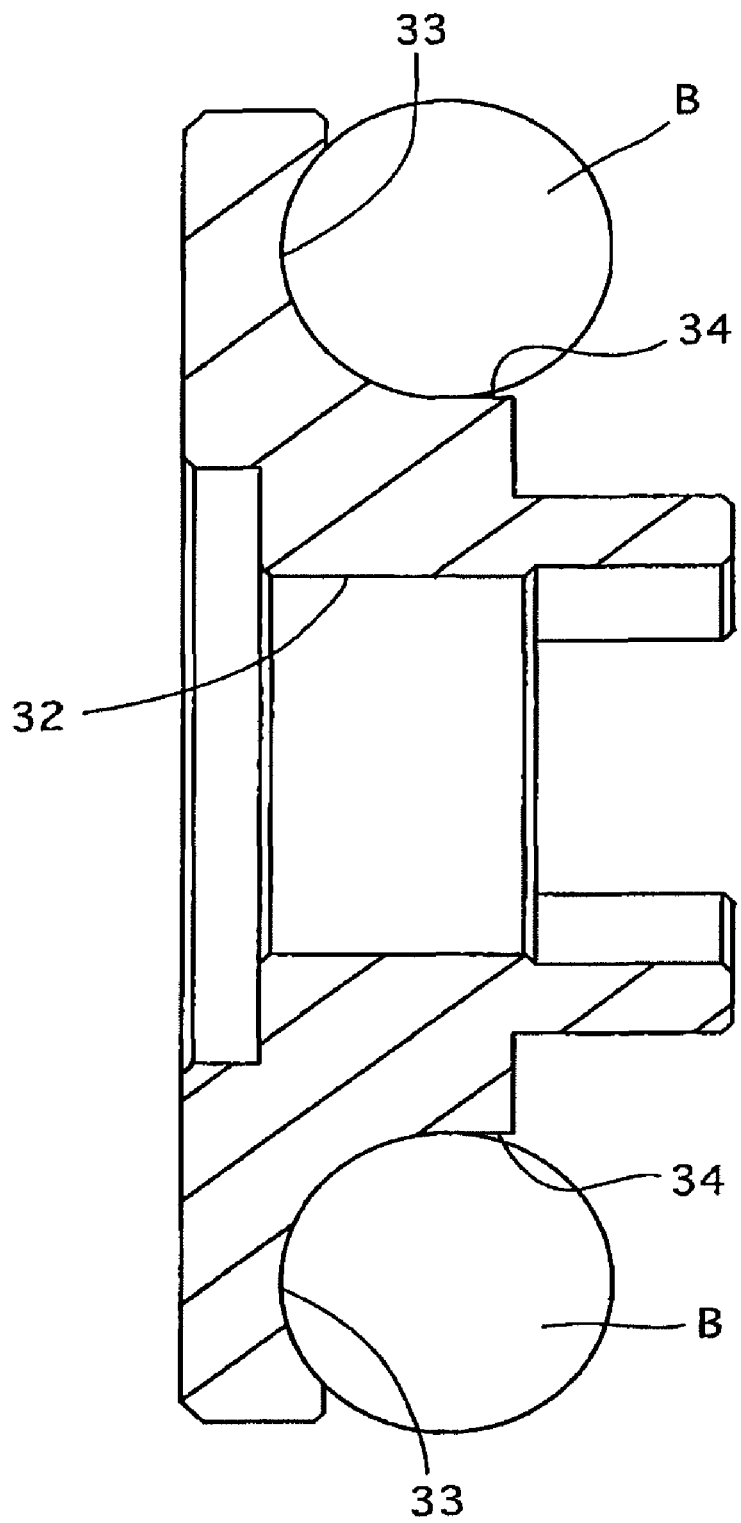
FIG. 6 is a longitudinal cross sectional view of the grooved member with the torque transfer balls installed in the grooves on the grooved member.

As shown in FIGS. 3 through 6, a total of four circumferential guide grooves 33 are formed on the outer peripheral surface of a rear half of the grooved member 29 at intervals of 90 degrees in a circumferential direction. Four double-headed arrows A1, A2, A3 and A4 shown in FIG. 3 by two-dot chain lines, each of which is in the shape of an arc, indicate the ranges of the four circumferential guide grooves 33, respectively. The shapes of the four circumferential guide grooves 33 are mutually identical and any two of the four circumferential guide grooves 33 adjacent to each other are communicatively connected to each other so that all the four circumferential guide grooves 33 form an annular groove as a whole. In addition, as shown in FIG. 6, the inner peripheral surface 34 of each circumferential guide groove 33 is in the shape of an arc with a predetermined curvature (predetermined diameter) in cross section taken along a plane orthogonal to the lengthwise direction of the circumferential guide groove 33. Furthermore, each circumferential guide groove 33 is shaped so that a central portion thereof in the lengthwise direction of the circumferential guide groove 33 is farthest from the large-diameter cylindrical surface 27 and that the distance from the circumferential guide groove 33 to the large-diameter cylindrical surface 27 decreases in either direction away from the central portion in the lengthwise direction of the circumferential guide groove 33. Accordingly, the radial distance R (see FIGS. 1 and 3) from the inner peripheral surface 34 of each circumferential guide groove 33 to the large-diameter cylindrical surface 27 of the cylindrical rotary output shaft 25 (i.e., the linear distance in a radial direction of the rotary input shaft 20 between the large-diameter cylindrical surface 27 and the inner peripheral surface 34 of each circumferential guide groove 33 at a position in the forward/rearward direction of the ultrasonic rotary drive device MU which corresponds to the center of a torque transfer ball B accommodated in the circumferential guide groove 33; see FIGS. 1 and 3) is greater at a central portion of the circumferential guide groove 33 in the lengthwise direction thereof and gradually decreases in the direction from this central portion to either end of the circumferential guide groove 33 in the lengthwise direction thereof.

Four torque transfer balls B made of metal which are spherical in shape and have the same curvatures as the four circumferential guide grooves 33 (the inner peripheral surfaces 34 of the circumferential guide grooves 33) are installed in the four circumferential guide grooves 33, respectively. As shown in FIG. 1, each torque transfer ball B is engaged in the associated circumferential guide groove 33 with the front end and the radially inner end of the torque transfer ball B positioned in the circumferential guide groove 33 and with the rear end of the torque transfer ball B in contact with the axially orthogonal surface 13 of the stationary cylindrical member 10 in a manner to allow the torque transfer ball B to rotate in the circumferential guide groove 33. In an initial state of the one-way rotational transfer mechanism DM, each torque transfer ball B is positioned at a center of the associated circumferential guide groove 33 in the lengthwise direction thereof as shown by a two-dot chain line P1 in FIG. 3 with the radially inner end of each torque transfer ball B engaged in a depression 34a formed at the center of the associated circumferential guide groove 33. Since front end portions of the four torque transfer members B and the four circumferential guide grooves 33 (the inner peripheral surfaces 34) are mutually identical in cross sectional shape (curvature), each torque transfer ball B is in line contact with the inner peripheral surface 34 of the associated circumferential guide groove 33 regardless of where the torque transfer ball B is engaged therein (see FIG. 6). Additionally, each torque transfer ball B is resiliently held at all times between the circumferential guide groove 33 (front portion thereof) and the axially orthogonal surface 13 of the stationary cylindrical member 10 since the grooved member 29 is resiliently biased rearward by the compression coil spring S1.

The structure of the ultrasonic motor UM that is integral with the one-way rotational transfer mechanism DM that has the above described structure will be discussed hereinafter.

The ultrasonic motor UM is provided with an ultrasonic generating member (ultrasonic generating portion) 40 which is formed as a ring member having an axis coincident with central axis A1. The ultrasonic generating member 40 is fitted onto the stationary cylindrical member 10 to be fixed thereto so that the central hole of the ultrasonic generating member 40 is fixed to an outer peripheral surface of the stationary cylindrical member 10. The ultrasonic generating member 40 is provided, at the rear end thereof on the radially outer side of the ultrasonic generating member 40, with a vibration transmission portion 41 having a ring shape when viewed from the front thereof. The rear end surface of the vibration transmission portion 41 is formed in a plane orthogonal to the central axis A1.

Additionally, the ultrasonic motor UM is provided at the rear end of the rotary input shaft 20 with a cylindrical rotary output shaft (rotary output portion) 44 having a closed rear end. The cylindrical rotary output shaft 44 is provided with an outer cylindrical portion 42 and an inner cylindrical portion 43 which are concentrically arranged. The inner cylindrical portion 43 is fitted on the rear end of the rotary input shaft 20 so that a central hole 45 of the cylindrical rotary output shaft 44 (central hole 45 of the inner cylindrical portion 43) is fixed onto the rear end of the rotary input shaft 20. The front end surface of the outer cylindrical portion 42 is formed in a plane orthogonal to the central axis A1, and is in contact with the rear end surface of the vibration transmission portion 41 to be slidable thereon to allow the ultrasonic generating member 40 and the outer cylindrical portion 42 to rotate relative to each other. The ultrasonic motor UM is provided, inside an internal space between the ultrasonic generating member 40 and the cylindrical rotary output shaft 44, with a cylindrical retainer 47 which is fitted on the outer peripheral surface of a rear end portion of the stationary cylindrical member 10 to be fixed thereto. A compression coil spring S2 is installed between the cylindrical retainer 47 and the outer ring 14 in a compressed state. The outer ring 14, the plurality of bearing balls 15 and the inner ring 16 are biased forward by the biasing force of the compression coil spring S2 so that the inner ring 16 is in resilient contact with the rear surfaces of the pair of radial projections 21.

The ultrasonic motor UM that has the above described structure is electrically connected to a controller (not shown) constructed from electronic components provided in the camera body such as a CPU.

Operations of the ultrasonic rotary drive device MU that has the above described structure will be discussed hereinafter.

Firstly, operations of the ultrasonic rotary drive device MU when an autofocusing operation is carried out will be discussed hereinafter.

Upon an AF switch (not shown) provided on the camera body being operated, the aforementioned controller that is provided in the camera body sends a drive signal to the ultrasonic motor UM for rotating the ultrasonic motor UM.

If this drive signal is a forward-rotation drive signal for rotating the ultrasonic motor UM in the forward direction, the vibration transmission portion 41 generates ultrasonic vibrations traveling in one circumferential direction (counterclockwise direction as viewed from the front). Thereupon, the cylindrical rotary output shaft 44 (the outer cylindrical portion 42) that is in contact with the rear end surface of the vibration transmission portion 41 rotates in the same direction as the ultrasonic vibrations generated by the vibration transmission portion 41, and accordingly, the rotary input shaft 20 that is integral with the cylindrical rotary output shaft 44 rotates counterclockwise as viewed from the front thereof. This counterclockwise rotation of the rotary input shaft 20 causes the grooved member 29, which is non-rotatable relative to the rotary input shaft 20, to rotate with the rotary input shaft 20 counterclockwise as viewed from the front thereof, thus causing each torque transfer ball B, which is held between the axially orthogonal surface 13 and the associated circumferential guide groove 33, to rotate about the center thereof while revolving around the rotary input shaft 20 (around the central axis A1 thereof) counterclockwise as viewed from the front thereof and remaining in contact with the associated circumferential guide groove 33 (the inner peripheral surface 34 thereof) while rolling thereon. The moving paths of the four torque transfer balls B when the four torque transfer balls B revolve around the rotary input shaft 20 are shown by double-headed arrows D in FIG. 3. At this time, the revolving speed of each torque transfer ball B is half the rotational speed of the rotary input shaft 20, and the revolving motions of the four torque transfer balls B are synchronized with one another. Thereupon, each torque transfer ball B, positioned at the above-mentioned initial position thereof at a center of the associated circumferential guide groove 33 in the lengthwise direction thereof as shown by a two-dot chain lines P1 in FIG. 3, moves toward the end of the associated circumferential guide groove 33 in the lengthwise direction thereof in the clockwise direction as viewed from the front thereof, and subsequently firmly wedges between the end in the clockwise direction as viewed from the front thereof of the inner peripheral surface 34 of the associated circumferential guide groove 33 and the large-diameter cylindrical surface 27 of the cylindrical rotary output shaft 25 (firmly pressed against the large-diameter cylindrical surface 27) simultaneously with the other torque transfer balls B (see the two-dot chain lines F2 in FIG. 3). This causes the rotary input shaft 20 and the cylindrical rotary output shaft 25 to become circumferentially integral with each other via the grooved member 29, the torque transfer balls, so that the rotation of the grooved member 29 (the rotary input shaft 20) is transferred to the cylindrical rotary output shaft 25, thus causing the cylindrical rotary output shaft 25 to rotate counterclockwise as viewed from the front thereof. Thereupon, this counterclockwise rotation of the cylindrical rotary output shaft 25 is transferred from the output gear 28 to the input gear of the aforementioned focusing mechanism (not shown), which is provided in the interchangeable lens, to move a focusing lens group (not shown) forward along the optical axis thereof.

On the other hand, if the aforementioned controller in the camera body outputs a reverse-rotation drive signal to the ultrasonic motor UM to rotate the ultrasonic motor UM in the reverse direction, the vibration transmission portion 41 generates ultrasonic vibrations traveling in the other circumferential direction (clockwise direction as viewed from the front thereof). Thereupon, the cylindrical rotary output shaft 44 that is in contact with the rear end surface of the vibration transmission portion 41 rotates in the same direction as the ultrasonic vibrations generated by the vibration transmission portion 41, and accordingly, the rotary input shaft 20 that is integral with the cylindrical rotary output shaft 44 rotates clockwise as viewed from the front thereof. This clockwise rotation of the rotary input shaft 20 causes the four torque transfer balls B to revolve (rotate) around the rotary input shaft 20 in the clockwise direction, as viewed from the front thereof, synchronously with one another along the circumferential guide grooves 33 (while remaining in contact with the circumferential guide grooves 33 (the inner peripheral surfaces 34 thereof) while rolling thereon) at a revolving speed half the rotational speed of the rotary input shaft 20. As a result, each torque transfer ball B revolves counterclockwise, as viewed from the front thereof, so as to firmly wedge between the other end in the counterclockwise direction as viewed from the front thereof of the inner peripheral surface 34 of the associated circumferential guide groove 33 in the lengthwise direction thereof and the large-diameter cylindrical surface 27 of the cylindrical rotary output shaft 25 (firmly pressed against the large-diameter cylindrical surface 27) simultaneously with the other torque transfer balls B (see two-dot chain line P3 in FIG. 3). This causes the rotary input shaft 20 and the cylindrical rotary output shaft 25 to become circumferentially integral with each other via the grooved member 29, the torque transfer balls B, so that the rotation of the grooved member 29 (the rotary input shaft 20) is transferred to the cylindrical rotary output shaft 25, thus causing the cylindrical rotary output shaft 25 to rotate clockwise as viewed from the front thereof. Thereupon, this clockwise rotation of the cylindrical rotary output shaft 25 is transferred from the output gear 28 to the input gear of the aforementioned focusing mechanism (not shown), which is provided in the interchangeable lens, to move the aforementioned focusing lens group (not shown) rearward along the optical axis thereof.

In this manner, the controller makes the ultrasonic motor UM rotate in forward and reverse directions to move the focusing lens forward and rearward to perform an autofocusing operation.

Immediately after an in-focus state is obtained by the autofocusing operation in this manner, the controller sends a control signal to the ultrasonic motor UM to slightly rotate the ultrasonic motor UM in a rotational direction opposite to the previous rotational direction (rotational direction immediately before focusing is obtained) of the ultrasonic motor UM (to a degree without rotating the cylindrical rotary output shaft 25). At this time, if each torque transfer ball B is currently wedged, at the position P2 shown in FIG. 3, between the large-diameter cylindrical surface 27 of the cylindrical rotary output shaft 25 and the inner peripheral surface 34 of the associated circumferential guide groove 33, the four torque transfer balls B move toward the positions P1 thereof while revolving around the rotary input shaft 20 synchronously with one another, so that the contacting forces of the four torque transfer balls B with the large-diameter cylindrical surface 27 and the inner peripheral surfaces 34 of the four circumferential guide grooves 33 reduce simultaneously. Accordingly, in the present embodiment of the one-way rotational transfer mechanism, since such contacting forces of all the four torque transfer balls B reduce simultaneously, the rotating operation of the ultrasonic motor UM (and also the rotating operations of the rotary input shaft 20 and the grooved member 29) for reducing the contacting force of each torque transfer ball B is performed smoothly.

This reduction in contacting force allows a manual focus ring (not shown) of the interchangeable lens to be rotated smoothly after such a reduction in contacting force.

Operations of the ultrasonic rotary drive device MU when a manual focusing operation is carried out will be discussed hereinafter.

If the manual focus ring of the interchangeable lens is manually rotated with no actuation of the ultrasonic motor UM, this rotation of the manual focus ring is transferred to the focusing mechanism provided in the interchangeable lens to perform a focusing operation (MF operation).

Immediately after the rotation of the manual focus ring is transferred to the focusing mechanism, rotational force is transferred from the focusing mechanism to the output gear 28 of the cylindrical rotary output shaft 25, so that the cylindrical rotary output shaft 25 rotates clockwise or counterclockwise about the rotary input shaft 20, whereas no rotation is transferred from the cylindrical rotary output shaft 25 to each torque transfer ball B since the large-diameter cylindrical surface 27 of the cylindrical rotary output shaft 25 is a cylindrical surface about the central axis A1. Therefore, rotation of the cylindrical rotary output shaft 25 does not cause either each torque transfer ball B or the grooved member 29 to rotate. Consequently, the cylindrical rotary output shaft 44 of the ultrasonic motor UM does not rotate, which prevents surfaces of the outer cylindrical portion 42 and the vibration transmission portion 41 which are in contact with each other from wearing away.

As described above, according to the above illustrated embodiment of the one-way rotational transfer mechanism DM, the four torque transfer balls B can be moved in the four circumferential guide grooves 33 in synchronization with one another, i.e., at the same corresponding positions, since the range of rotation (revolution) of each toque transfer ball B is limited by the associated circumferential guide groove 33 of the grooved member 29, i.e., since each toque transfer ball B is guided by the associated circumferential guide groove 33 of the grooved member 29. Accordingly, the rotating operations of each torque transfer ball B, the grooved member 29 and the cylindrical rotary output shaft 25 (specifically, the operation for releasing each torque transfer member B which is firmly wedged between the large-diameter cylindrical surface 27 of the cylindrical rotary output shaft 25 and the inner peripheral surface 34 of the associated circumferential guide groove 33 from the wedged state) can be performed smoothly.

Moreover, since the grooved member 29 is an member which rotates with the rotary input shaft 20, the one-way rotational transfer mechanism DM is simpler in structure than the one-way rotational transfer mechanism disclosed in Patent document 1 that requires a retainer which rotates relative to a rotary input member corresponding to the rotary input shaft 20.

In addition, if the one-way rotational transfer mechanism DM and the ultrasonic motor UM are combined in the above described manner, the cylindrical rotary output shaft 25 rotates when the ultrasonic motor UM rotates, whereas the cylindrical rotary output shaft 44 of the ultrasonic motor UM does not rotate when the cylindrical rotary output shaft 25 is rotated with no actuation of the ultrasonic motor UM, and accordingly, friction between the outer cylindrical portion 42 and the vibration transmission portion 41 of the ultrasonic motor UM that is caused when the ultrasonic generating member 40 and the outer cylindrical portion 42 rotate relative to each other can be minimized.

Additionally, the one-way rotational transfer mechanism DM is not susceptible to use conditions of the camera (e.g., temperature of the camera at a time of exposure), and operates smoothly even if any changes in use conditions occur.

Furthermore, if the structure of the above described embodiment of the ultrasonic rotary drive device is adopted, a photographing state can be switched between AF mode and MF mode without the need for a switch for switching a photographing state between AF mode and MF mode.

A torque can be reliably transferred from the rotary input shaft 20 to the cylindrical rotary output shaft 25 because each torque transfer ball B is made to revolve (rotate) around the rotary input shaft 20 in the same rotational direction as the rotary input shaft 20 while trailing behind the rotation of the rotary input shaft 20 (i.e., while revolving at a slower speed than the rotation of the rotary input shaft 20 in association with the rotation of said rotary input shaft 20), and because each torque transfer ball B is made to wedge firmly between the grooved member 29 and the cylindrical rotary output shaft 25 (because each torque transfer ball B is made to serve as a torque transfer member).

Although the present invention has been discussed with reference to the above described embodiment, the present invention is not limited solely thereto; making various modifications to the ultrasonic rotary drive device is possible.

For instance, the structure of the ultrasonic rotary drive device MU can be modified so that a rotary input member is made as a combination of the rotary input shaft 20 and the grooved member 29 which are molded in one and so that each torque transfer ball B is continuously held between the axially orthogonal surface 13 and the associated circumferential guide groove 33. Even if such modifications are made to the ultrasonic rotary drive device MU, similar effects can be obtained; moreover, the structure of the one-way rotational transfer mechanism DM can be made simpler because the compression coil spring S1 becomes unnecessary.

The cross sectional shape of each circumferential guide groove 33 is not limited solely to that of the above described embodiment. For instance, a circumferential guide groove 35 having a cross sectional shape shown in FIG. 7 can be adopted instead of each circumferential guide groove 33. In the case shown in FIG. 7, each torque transfer ball B is not in line contact with the inner peripheral surface of the associated circumferential guide groove 35 but in point contact with the inner peripheral surface of the associated circumferential guide groove 35 at three points.

Figure 4:
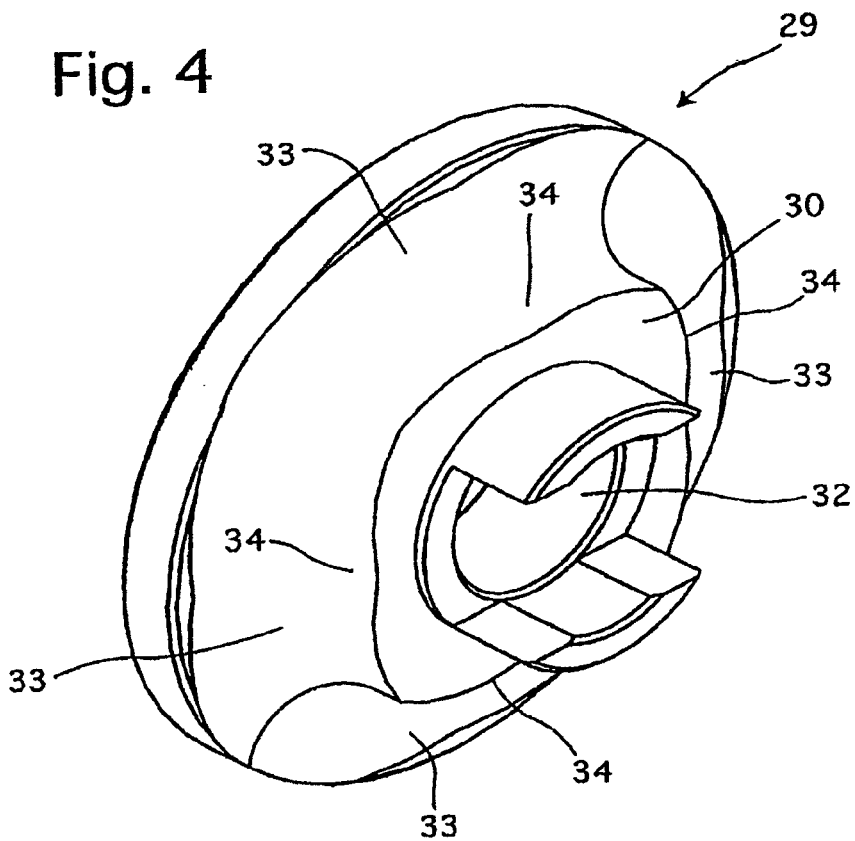
FIG. 4 is a perspective view of a grooved member shown in FIG. 2.
Figure 5:
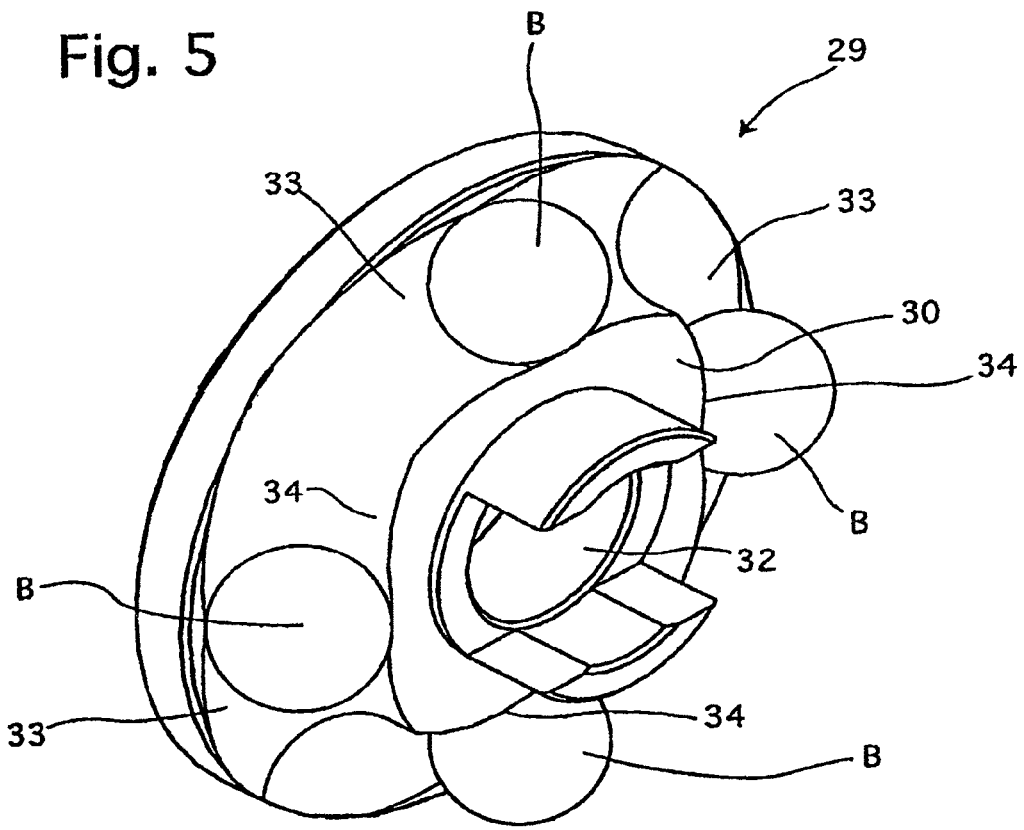
FIG. 5 is a perspective view of the grooved member and torque transfer balls engaged in grooves formed on the grooved member.
Figure 8:
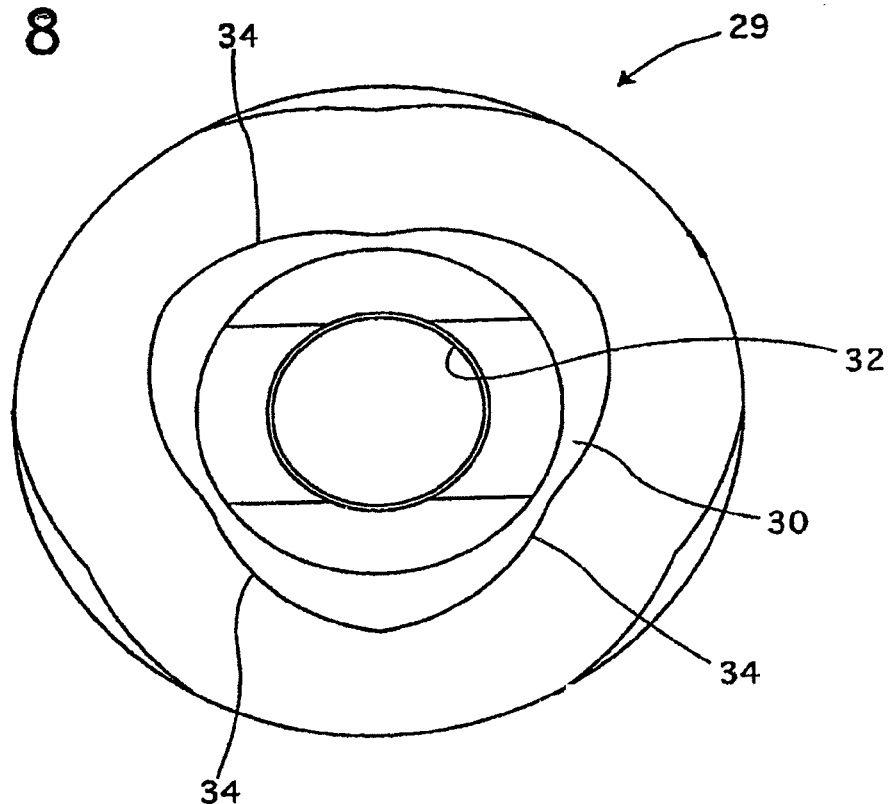
FIG. 8 is a front elevation of a second modified embodiment of the grooved member.
Figure 9:
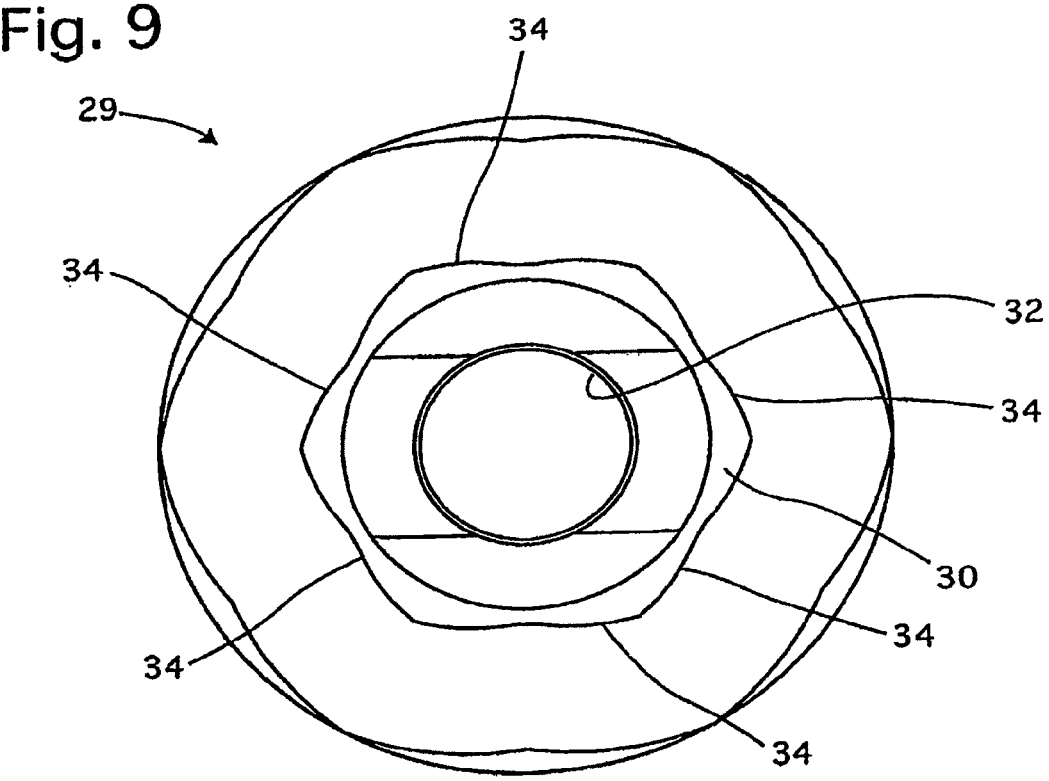
FIG. 9 is a front elevation of a third modified embodiment of the grooved member.

In addition, a small-diameter portion 30 formed at the rear end of the grooved member 29 can be substantially triangular or hexagonal in cross section shape as shown in FIG. 8 or 9, respectively, as an alternative to the substantially square small-diameter portion 30 shown in FIG. 4. With this modification shown in FIGS. 8 and 9, the number of circumferential guide grooves each corresponding to each circumferential guide groove 33 becomes three and six, respectively, which makes it possible to change the efficiency of transferring torque from the rotary input shaft 20 to the cylindrical rotary output shaft 25. The small-diameter portion 30 can be formed in any polygonal shape in cross section other than substantially triangular and hexagonal shapes. Additionally, not all the circumferential guide grooves 33 have to be provided therein with a torque transfer ball B, and the number of the torque transfer balls B that are installed into the circumferential guide grooves 33 can be changed according to the efficiency of transferring torque from the rotary input shaft 20 to the cylindrical rotary output shaft 25 as required.

The efficiency of transferring torque from the rotary input shaft 20 to the cylindrical rotary output shaft 25 can be changed by changing the wedge angle between the large-diameter cylindrical surface 27 of the cylindrical rotary output shaft 25 and one end of the inner peripheral surface 34 of each circumferential guide groove 33, or by changing the following factors: the spring force of the compression coil spring S1, the surface friction of the axially orthogonal surface 13 and the surface friction of each circumferential guide groove 33 (35).

In addition, although the ultrasonic rotary drive device is applied to an interchangeable lens designed for autofocus in the above illustrated embodiment of the ultrasonic rotary drive device, the ultrasonic rotary drive device can be installed between a zoom ring (hand-operated ring) which is provided on an interchangeable zoom lens and a zooming mechanism which is provided in the interchangeable lens to be linked with the zoom ring so that rotation of the ultrasonic motor UM (used as a zoom motor) is transferred to the zooming mechanism and so that rotation of the zoom ring is not transferred to the ultrasonic motor UM. This makes a power zoom operation (motor-driven zooming operation) and a manual zoom operation possible without the need for any switch for switching between power zoom mode and manual zoom mode.

Figure 10:
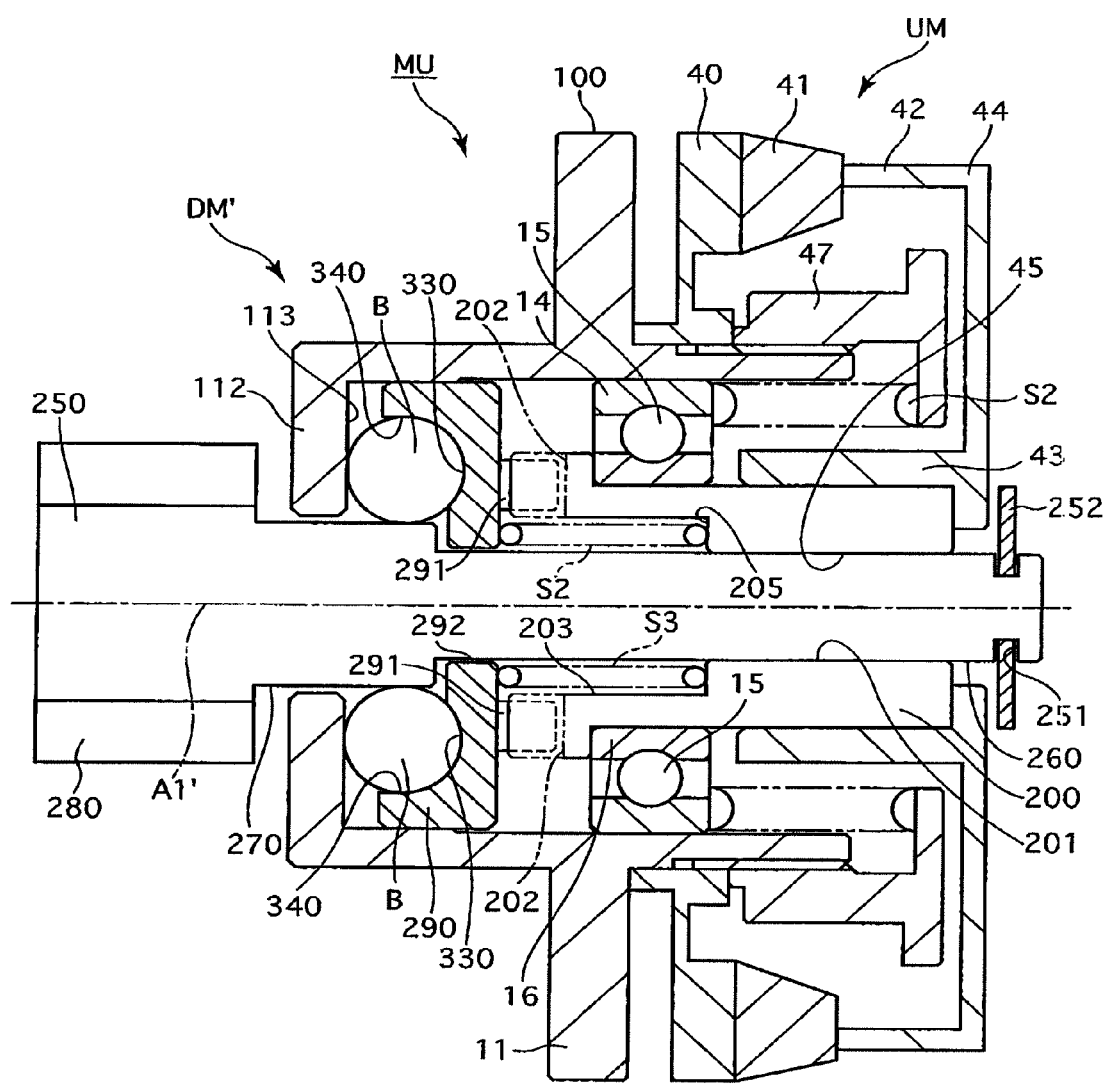
FIG. 10 is a view similar to that of FIG. 1, showing another embodiment of the ultrasonic rotary drive device according to the present invention.

FIG. 10 shows another embodiment (second embodiment) of the ultrasonic rotary drive device according to the present invention. In this embodiment, elements and parts similar to those in the previous embodiment (first embodiment) of the ultrasonic rotary drive device are designated by the same reference numerals. The second embodiment of the ultrasonic rotary drive device is substantially identical to the first embodiment of the ultrasonic rotary drive device except that the one-way rotational transfer mechanism DM' in the second embodiment of the ultrasonic rotary drive device is different in structure from the one-way rotational transfer mechanism DM in the first embodiment of the ultrasonic rotary drive device. In the second embodiment of the ultrasonic rotary drive device, the rotary input shaft is positioned around the rotary output shaft, whereas in the first embodiment of the ultrasonic rotary drive device the rotary output shaft is positioned around the rotary input shaft. Namely, the one-way rotational transfer mechanism DM' in the second embodiment of the ultrasonic rotary drive device is provided with a cylindrical (hollow-cylindrical) rotary input shaft (rotary input member) 200 which is press-fitted in the central hole 45 of the cylindrical rotary output shaft 44 (central hole 45 of the inner cylindrical portion 43) to be fixed thereto so that the cylindrical rotary input shaft 200 rotates integrally with the cylindrical rotary output shaft 44 about a central axis A1' of the cylindrical rotary input shaft 200, and is further provided with a rotary output shaft 250 which is fitted in a small-diameter central hole 201 of the cylindrical rotary input shaft 200 to be concentric with the cylindrical rotary input shaft 200 so that the rotary output shaft 250 is freely rotatable relative to the cylindrical rotary input shaft 200 on the axis thereof which is coincident with the central axis A1' of the cylindrical rotary input shaft 200. The rear end of the rotary output shaft 250 projects rearward from the rear end of the cylindrical rotary output shaft 44 of the ultrasonic motor UM and is provided with a circumferential groove 251. A lock washer 252 is fitted in the circumferential groove 251 to prevent the rotary output shaft 250 from moving forward with respect to the cylindrical rotary output shaft 44 of the ultrasonic motor UM.

The one-way rotational transfer mechanism DM' is provided with a stationary cylindrical member (holding member) 100 (which corresponds to the stationary cylindrical member 10 in the first embodiment of the ultrasonic rotary drive device), the front and rear ends of which are formed as open ends. The stationary cylindrical member 100 is different from the stationary cylindrical member 10 in that the front end of the stationary cylindrical member 100 is extended forward so that an annular inner flange 112 corresponding to the annular inner flange 12 is positioned immediately in front of the torque transfer balls B with respect to the central axis A1' direction. The rear surface (inner surface) of the annular inner flange 112 is formed as an axially orthogonal surface 113 which lies in a plane orthogonal to the central axis A1' of the cylindrical rotary input shaft 200.

The cylindrical rotary input shaft 200 is provided at the front end thereof with a pair of engaging grooves 202 which are arranged circumferentially at intervals of 180 degrees. The pair of engaging grooves 202 is identical in function to the pair of radial projections 21 of the rotary input shaft 20. The one-way rotational transfer mechanism DM' is provided, radially inside of the stationary cylindrical member 100 between the annular inner flange 112 and the front end of the cylindrical rotary input shaft 200, with a ring-shaped grooved member (rotary input member) 290 which is fitted on the rotary output shaft 250 and is concentric with the rotary output shaft 250. The front end of the rotary output shaft 250 projects forward from the annular inner flange 112 and is provided on the outer peripheral surface of this front end with an output gear 280 which is engaged with an input gear of a focusing mechanism (not shown) installed inside the interchangeable lens. The rotary output shaft 250 is provided immediately behind the output gear 280 with a large-diameter cylindrical surface 270 about the central axis A1' and extends rearward to a position in the direction of the central axis A1' immediately in front of the radially inner end of the grooved member 290. A portion of the rotary output shaft 250 behind the large-diameter cylindrical surface 270 in the direction of the central axis A1' is formed as a small-diameter cylindrical portion about the central axis A1'. Accordingly, this small-diameter cylindrical portion of the rotary output shaft 250 is fitted in the small-diameter central hole 201 of the cylindrical rotary input shaft 200 so that the rotary output shaft 250 is freely rotatable relative to the cylindrical rotary input shaft 200.

The cylindrical rotary input shaft 200 is provided on a front half of the inner peripheral surface thereof with a cylindrical recess 203 which is recessed radially outwards, and a compression coil spring (biasing device) S3 is installed in the cylindrical recess 203 in a compressed state over the rotary output shaft 250 between a rear end surface of the grooved member 290 and a rear end surface 205 in the cylindrical recess 203 which face each other so that the grooved member 290 is continuously biased forward by the biasing force of the compression coil spring S3. The inner peripheral surface of the cylindrical rotary input shaft 200 in the cylindrical recess 203 serves as a large-diameter inner peripheral surface of the cylindrical rotary input shaft 200.

A circular central hole 292 which is centered at the central axis A1' is formed in the grooved member 290 therethrough, and the grooved member 290 is fitted on the rotary output shaft 250 (the small-diameter cylindrical portion thereof) to allow the grooved member 290 to move in the direction of the central axis A1' relative to the rotary output shaft 250. The grooved member 290 is provided on the rear surface thereof with a pair of engaging projections 291 which project rearward to be engaged in the pair of engaging grooves 202 of the cylindrical rotary input shaft 200, respectively, so that the grooved member 290 rotates integrally with the cylindrical rotary input shaft 200 (i.e., the grooved member 290 is prevented from rotating relative to the cylindrical rotary input shaft 200).

Figure 11:
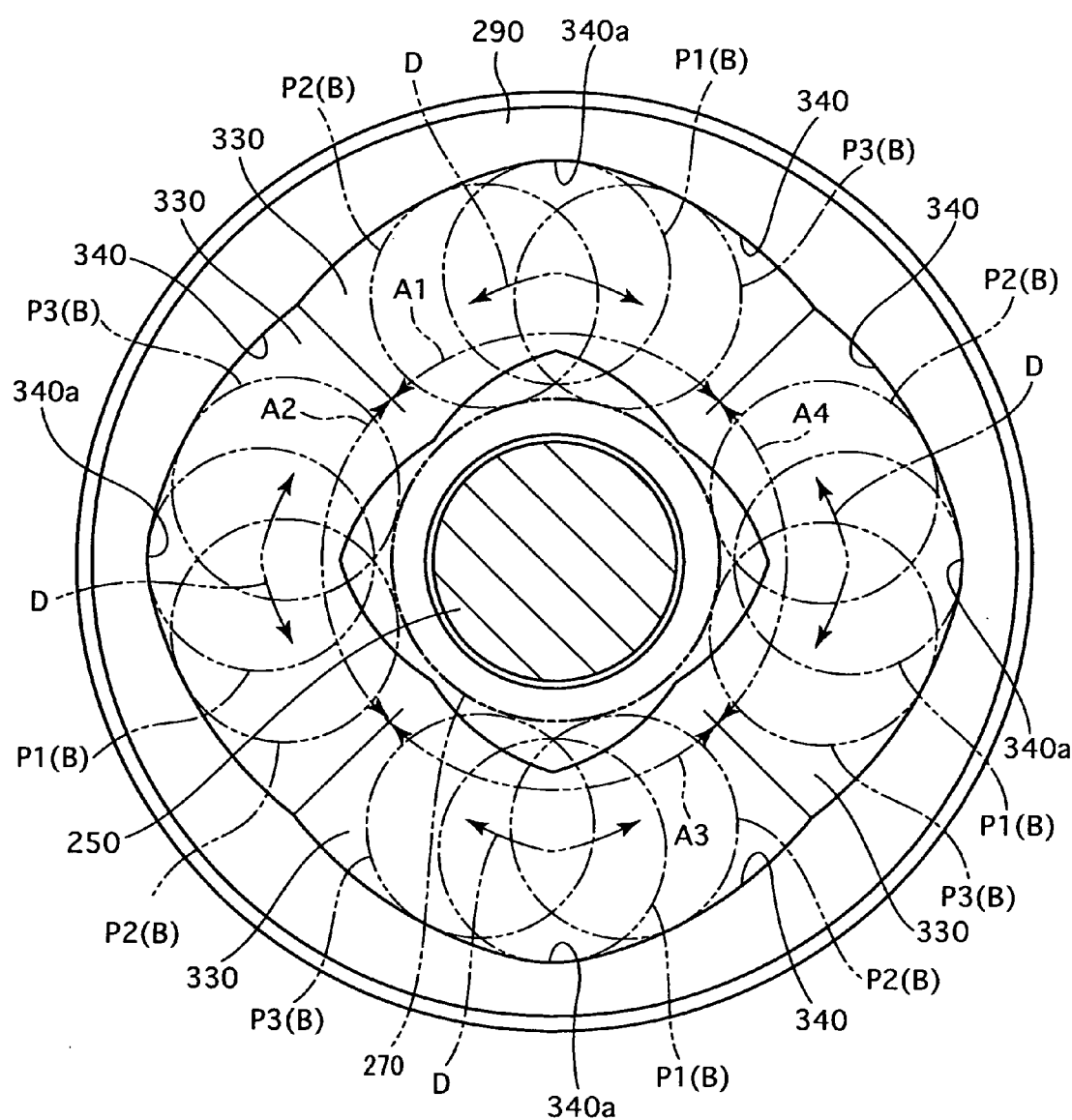
FIG. 11 is a view similar to that of FIG. 3, showing movements of torque transfer balls engaged in grooves formed on a grooved member shown in FIG. 10.
Figure 12:
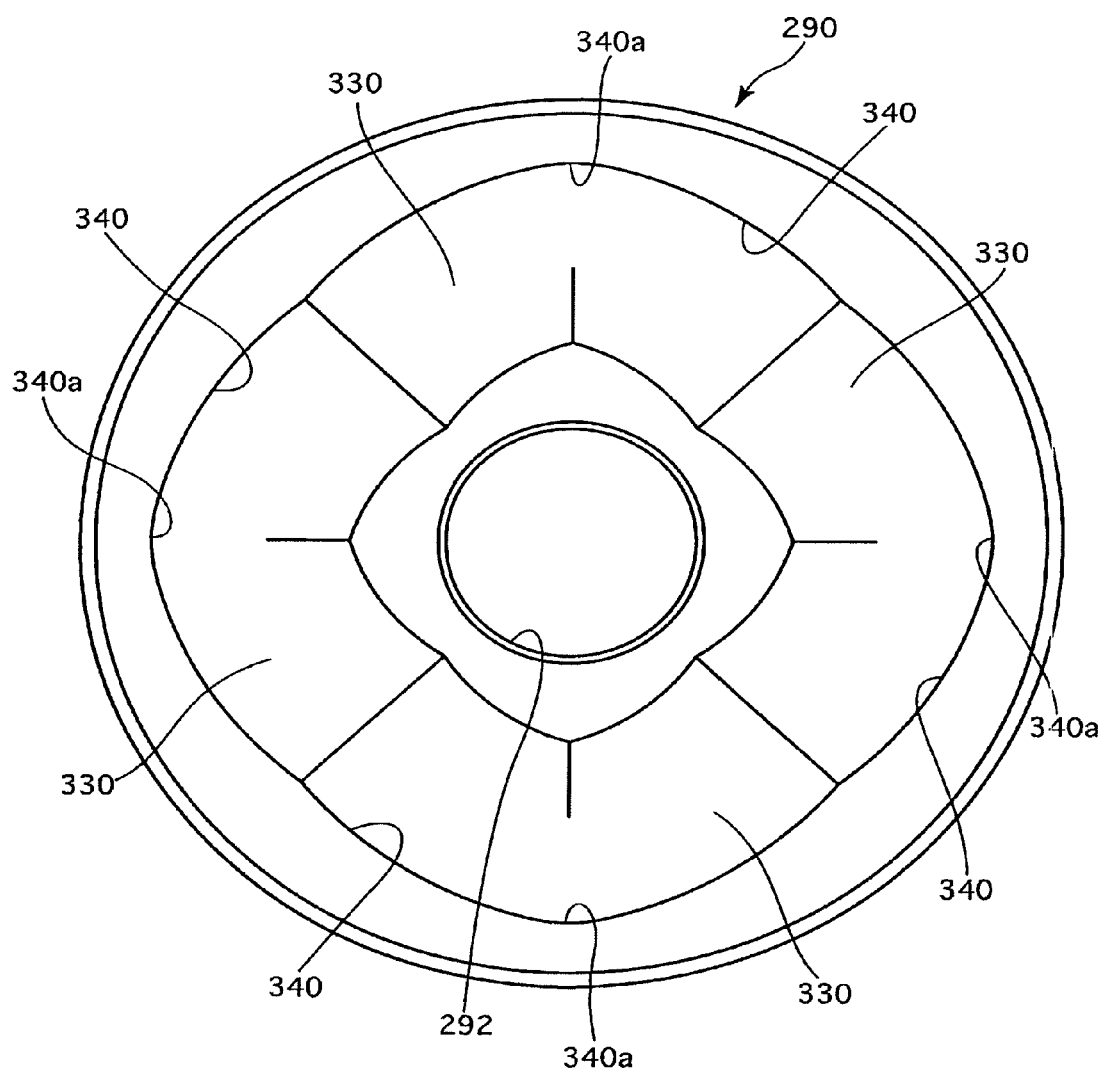
FIG. 12 is a front elevational view of the grooved member shown in FIG. 10.
Figure 13:
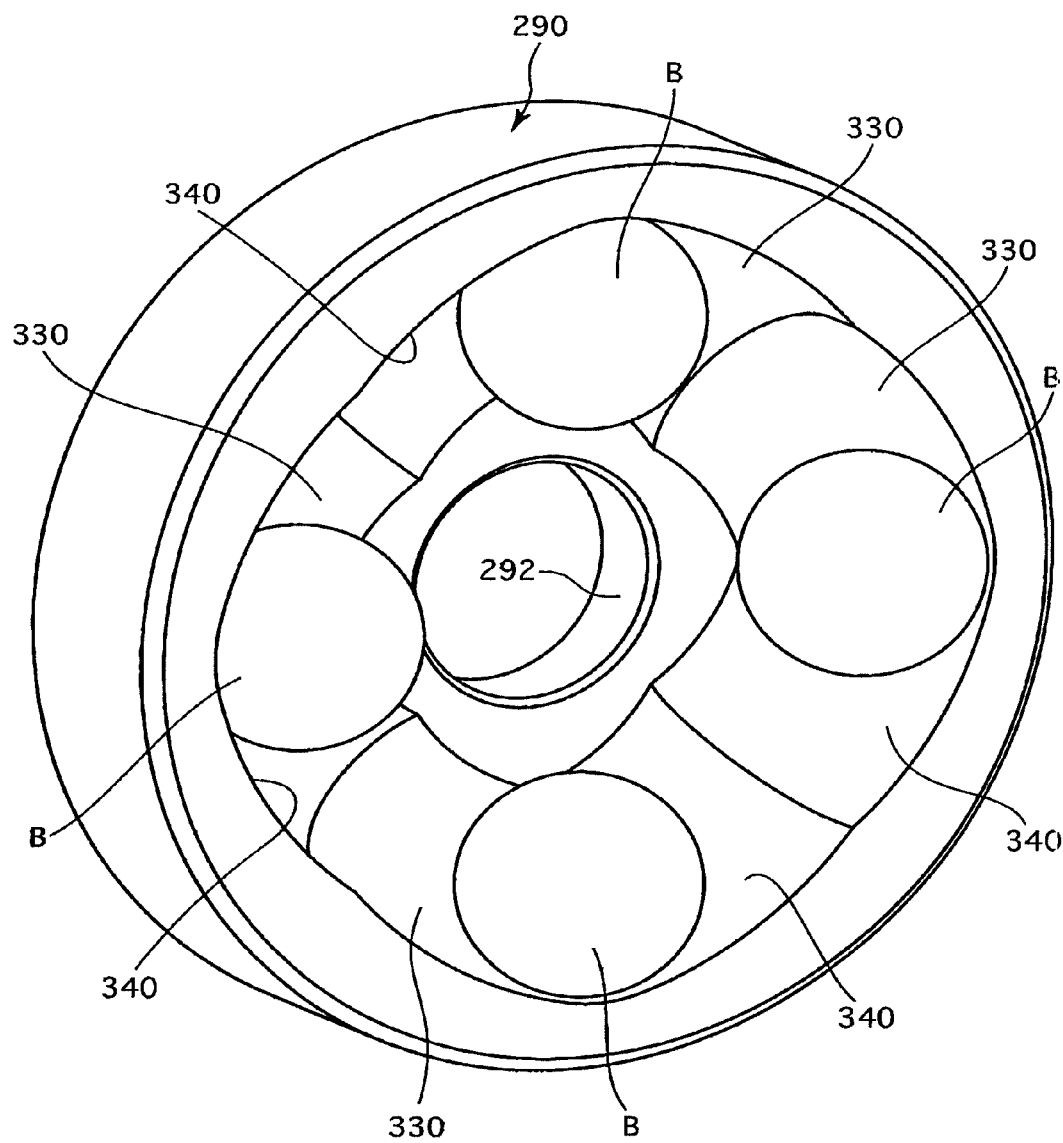
FIG. 13 is a front perspective view of the grooved member shown in FIG. 10 and the torque transfer balls engaged in the grooves of the grooved member.
Figure 14:
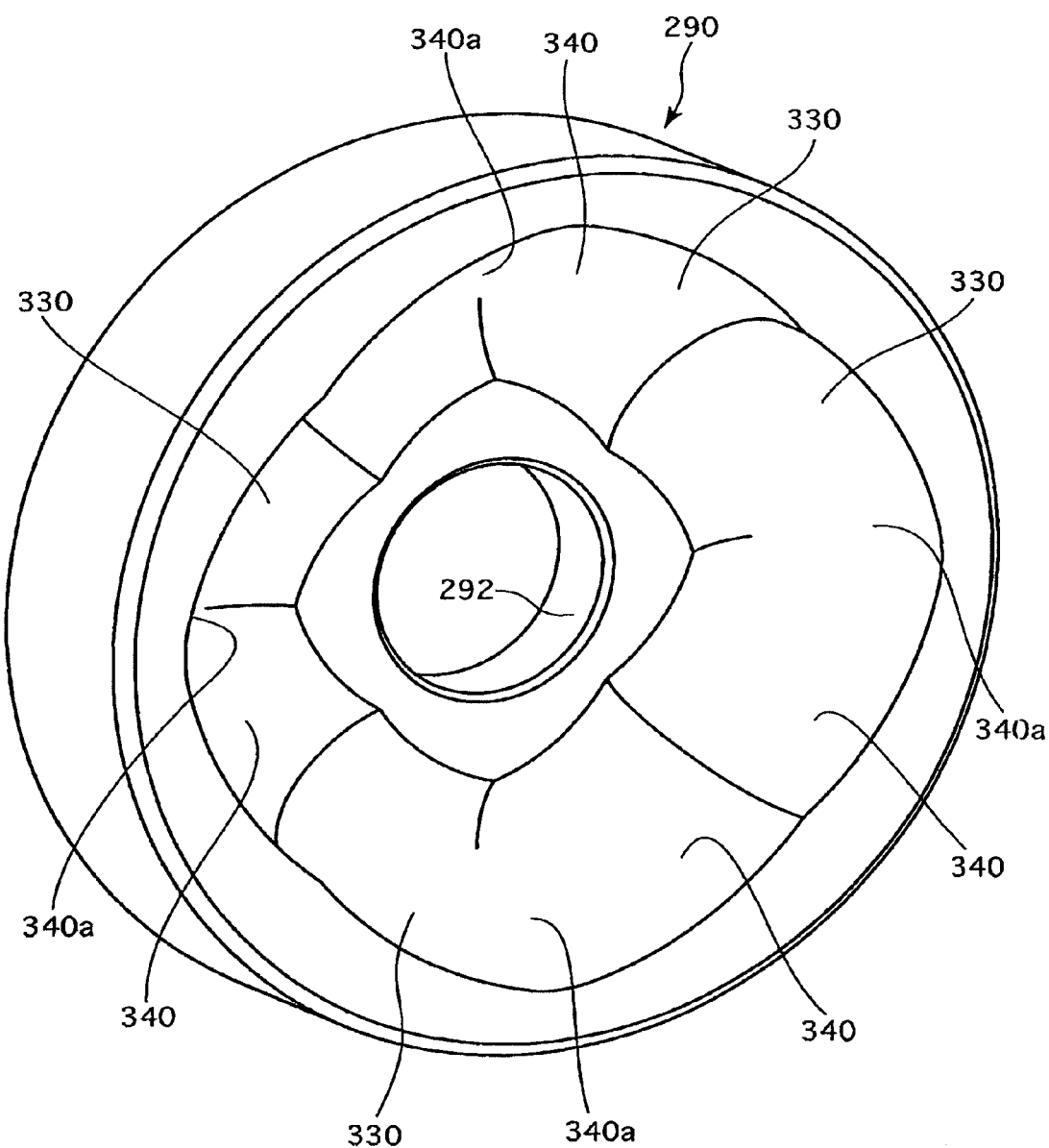
FIG. 14 is a front perspective view of the grooved member shown in FIG. 10.

A total of four circumferential guide grooves 330 (which correspond to the four circumferential guide grooves 33 of the grooved member 29 in the first embodiment of the ultrasonic rotary drive device) are formed on the inner peripheral surface of a front half of the grooved member 290 at intervals of 90 degrees in a circumferential direction. Four double-headed arrows A1, A2, A3 and A4 shown in FIG. 11 by two-dot chain lines, each of which is in the shape of an arc, indicate the ranges of the four circumferential guide grooves 330, respectively. The shapes of the four circumferential guide grooves 330 are mutually identical and any two of the four circumferential guide grooves 330 adjacent to each other are communicatively connected to each other so that all the four circumferential guide grooves 330 form an annular groove as a whole.

In addition, similar to the inner peripheral surface 34 of each circumferential guide groove 33 of the grooved member 29, the inner peripheral surface 340 of each circumferential guide groove 330 is in the shape of an arc with a predetermined curvature (predetermined diameter) in cross section taken along a plane orthogonal to the lengthwise direction of the circumferential guide groove 330. Furthermore, each circumferential guide groove 330 is shaped so that a central portion thereof in the lengthwise direction of the circumferential guide groove 330 is farthest from the large-diameter cylindrical surface 270 and that the distance from the circumferential guide groove 330 to the large-diameter cylindrical surface 270 decreases in either direction away from the central portion in the lengthwise direction of the circumferential guide groove 330. Accordingly, the radial distance from the inner peripheral surface 340 of each circumferential guide groove 330 to the large-diameter cylindrical surface 270 of the rotary output shaft 250 is greater at a central portion of the circumferential guide groove 330 in the lengthwise direction thereof and gradually decreases in the direction from this central portion to either end of the circumferential guide groove 330 in the lengthwise direction thereof.

Four torque transfer balls B are installed in the four circumferential guide grooves 330, respectively. As shown in FIG. 10, each torque transfer ball B is engaged in the associated circumferential guide groove 330 with the rear end and the radially outer end of the torque transfer ball B positioned in the circumferential guide groove 330 and with the front end of the torque transfer ball B in contact with the axially orthogonal surface 113 of the annular inner flange 112 of the stationary cylindrical member 100 in a manner to allow the torque transfer ball B to rotate in the circumferential guide groove 330. In an initial state of the one-way rotational transfer mechanism DM', each torque transfer ball B is positioned at a center of the associated circumferential guide groove 330 in the lengthwise direction thereof as shown by a two-dot chain line P1 in FIG. 11 with the radially outer end of each torque transfer ball B engaged in a depression 340a formed at the center of the associated circumferential guide groove 330. Since rear end portions of the four torque transfer members B and the four circumferential guide grooves 330 (the inner peripheral surfaces 340) are mutually identical in cross sectional shape (curvature), each torque transfer ball B is in line contact with the inner peripheral surface 340 of the associated circumferential guide groove 330 regardless of where the torque transfer ball B is engaged therein. Additionally, each torque transfer ball B is resiliently held at all times between the circumferential guide groove 330 (rear portion thereof) and the axially orthogonal surface 113 of the stationary cylindrical member 100 since the grooved member 290 is resiliently biased forward by the compression coil spring S3.

According to the second embodiment of the ultrasonic rotary drive device, an effect similar to that obtained in the first embodiment of the ultrasonic rotary drive device is obtained. Namely, the four torque transfer balls B can be moved in the four circumferential guide grooves 330 in synchronization with one another, i.e., at the same corresponding positions, since the range of rotation (revolution) of each toque transfer ball B is limited by the associated circumferential guide groove 330 of the grooved member 290, i.e., since each toque transfer ball B is guided by the associated circumferential guide groove 330 of the grooved member 290. Accordingly, the rotating operations of each torque transfer ball B, the grooved member 290 and the rotary output shaft 250 (specifically, the operation for releasing each torque transfer member B which is firmly wedged between the large-diameter cylindrical surface 270 of the rotary output shaft 250 and the inner peripheral surface 340 of the associated circumferential guide groove 330 from the wedged state) can be performed smoothly.

Moreover, since the grooved member 290 rotates with the cylindrical rotary input shaft 200, the one-way rotational transfer mechanism DM' is simpler in structure than the one-way rotational transfer mechanism disclosed in Patent Document 1 that requires a retainer which rotates relative to a rotary input member corresponding to the cylindrical rotary input shaft 200.

Regarding the second embodiment of the ultrasonic rotary drive device, the structure of the ultrasonic rotary drive device MU can be modified so that a rotary input member is made as a combination of the cylindrical rotary input shaft 200 and the grooved member 290 which are molded in one and so that each torque transfer ball B is continuously held between the axially orthogonal surface 113 and the associated circumferential guide groove 330. Even if such modifications are made to the second embodiment of the ultrasonic rotary drive device MU, similar effects can be obtained; moreover, the structure of the one-way rotational transfer mechanism DM' can be made simpler because the compression coil spring S3 is unnecessary.

Figure 7:
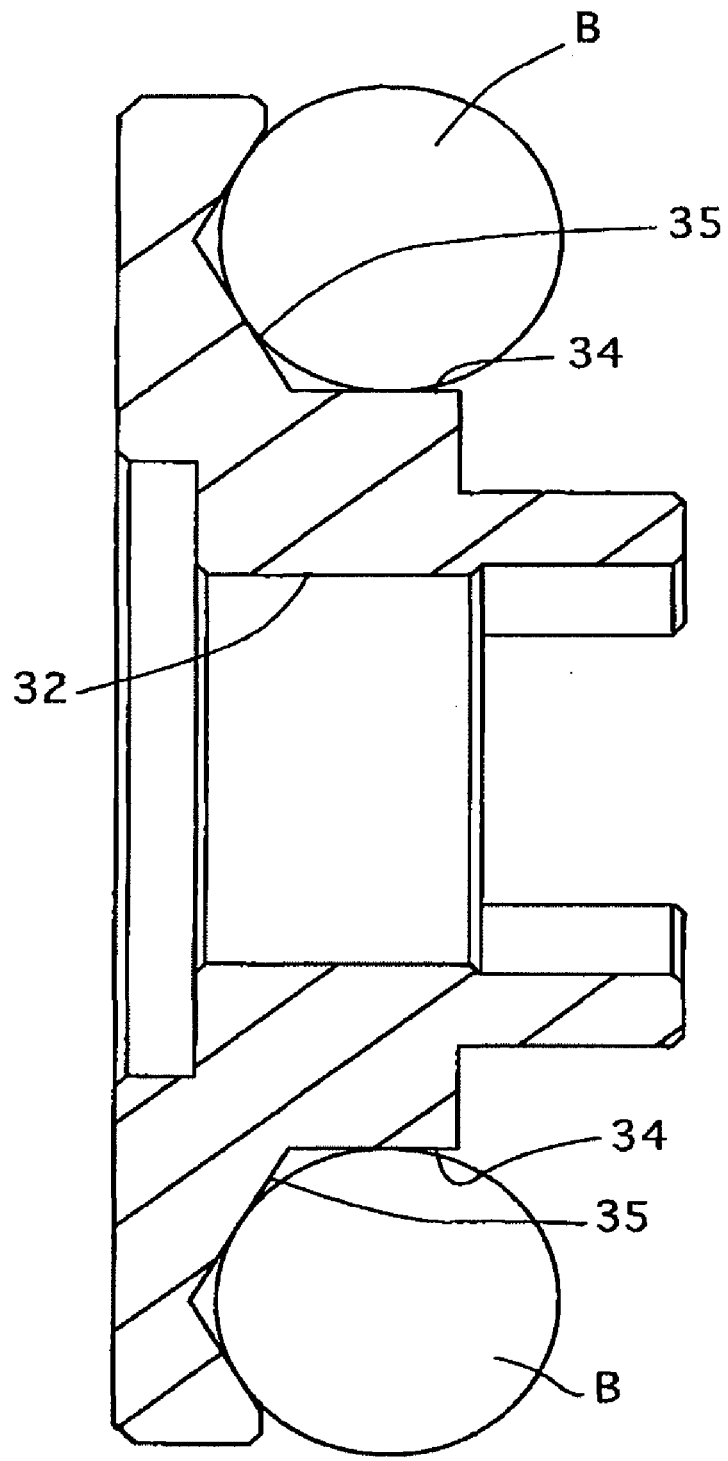
FIG. 7 is a view similar to that of FIG. 6, showing a first modified embodiment of the grooved member.

In addition, a modification similar to that shown in the first, second or third modified embodiment of the grooved member shown in FIG. 7, 8 or 9 can also be made to the second embodiment of the ultrasonic rotary drive device.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A one-way rotational transfer mechanism comprising:
   a rotary input member rotatable about an axis;
   a holding member including an axially orthogonal surface lying on a plane orthogonal to said axis;
   a hollow-cylindrical rotary output shaft positioned coaxially around said rotary input member to be rotatable relative to said rotary input member, and including a cylindrical inner peripheral surface centered on said axis;
   a circumferential guide groove which is formed in an arc shape with a predetermined curvature in cross section on a portion of said rotary input member which faces said axially orthogonal surface of said holding member so as to surround said axis as viewed in a direction of said axis; and
   a torque transfer ball, identical in curvature to said circumferential guide groove, and installed in between said axially orthogonal surface, said cylindrical inner peripheral surface and said circumferential guide groove, so as to roll on said axially orthogonal surface and to be continuously held between said axially orthogonal surface and said circumferential guide groove,
   wherein said circumferential guide groove is shaped to make said torque transfer ball revolve around said rotary input member in a same rotational direction as said rotary input member while trailing behind rotation of said rotary input member and to make said torque transfer ball press against said cylindrical inner peripheral surface when said rotary input member is rotated.

2. The one-way rotational transfer mechanism according to claim 1, wherein said rotary input member comprises:
   a rotary input shaft rotatable about said axis;
   a grooved member which is non-rotatable relative to said rotary input shaft about said axis and movable relative to said rotary input shaft along said axis, said circumferential guide groove being formed on said grooved member; and
   a biasing device which biases said grooved member toward said axially orthogonal surface.

3. The one-way rotational transfer mechanism according to claim 1, wherein a plurality of said circumferential guide grooves having common dimensions each accommodate one of said torque transfer balls.

4. The one-way rotational transfer mechanism according to claim 1, wherein said holding member is shaped into a cylinder which is positioned around said rotary input member.

5. The one-way rotational transfer mechanism according to claim 1, wherein a plurality of said circumferential guide grooves are positioned at regular intervals about said axis.

6. The one-way rotational transfer mechanism according to claim 3, wherein said plurality of said circumferential guide grooves are communicatively connected to one another so that all said plurality of said circumferential guide grooves form an annular groove positioned around said axis.

7. The one-way rotational transfer mechanism according to claim 1, wherein a distance between an inner peripheral surface of said circumferential guide groove and said cylindrical inner peripheral surface of said hollow-cylindrical rotary output shaft changes at different positions on said inner peripheral surface in a circumferential direction about said axis.

8. The one-way rotational transfer mechanism according to claim 7, wherein a distance from said inner peripheral surface of said circumferential guide groove to said cylindrical inner peripheral surface in a radial direction of said rotary input member is greater at a central portion of said circumferential guide groove in a lengthwise direction thereof, and decreases at a position away from said central portion toward either end of said circumferential guide groove in said lengthwise direction thereof.

9. The one-way rotational transfer mechanism according to claim 2, wherein said grooved member is cylindrically shaped and is fitted on said rotary input shaft to be allowed to slide on said rotary input shaft along said axis and to be prevented from rotating relative to said rotary input shaft about said axis.

10. The one-way rotational transfer mechanism according to claim 2, wherein said cylindrical inner peripheral surface of said hollow-cylindrical rotary output shaft comprises a small-diameter inner peripheral surface which is smaller in diameter than a large-diameter cylindrical inner peripheral surface of said hollow-cylindrical rotary output shaft, said biasing device being positioned between said small-diameter inner peripheral surface and an outer peripheral surface of said rotary input shaft.

11. The one-way rotational transfer mechanism according to claim 2, wherein said biasing device comprises a compression coil spring.

12. An ultrasonic rotary drive device incorporating an ultrasonic motor, and said one-way rotational transfer mechanism according to claim 1, said ultrasonic motor comprising:
   an ultrasonic generating portion; and
   a rotary output portion which is in contact with said ultrasonic generating portion to be rotatable relative to said ultrasonic generating portion, is non-rotatable relative to said rotary input portion, and rotates by ultrasonic vibrations generated by said ultrasonic generating portion.

* * * * *